M. WATERBURY.
Seed Dropper.

No. 11,980.

Patented Nov. 21, 1854.

UNITED STATES PATENT OFFICE.

MILAN WATERBURY, OF CUBA, NEW YORK.

IMPROVEMENT IN SEED-PLANTERS.

Specification forming part of Letters Patent No. 11,980, dated November 21, 1854.

*To all whom it may concern:*

Be it known that I, MILAN WATERBURY, of Cuba, in the county of Allegany and State of New York, have invented certain new and useful Improvements in Seed-Planters; and I do hereby declare the following to be a full, clear, and exact description of the same, reference being had to the accompanying drawings, in which—

Figure 1:
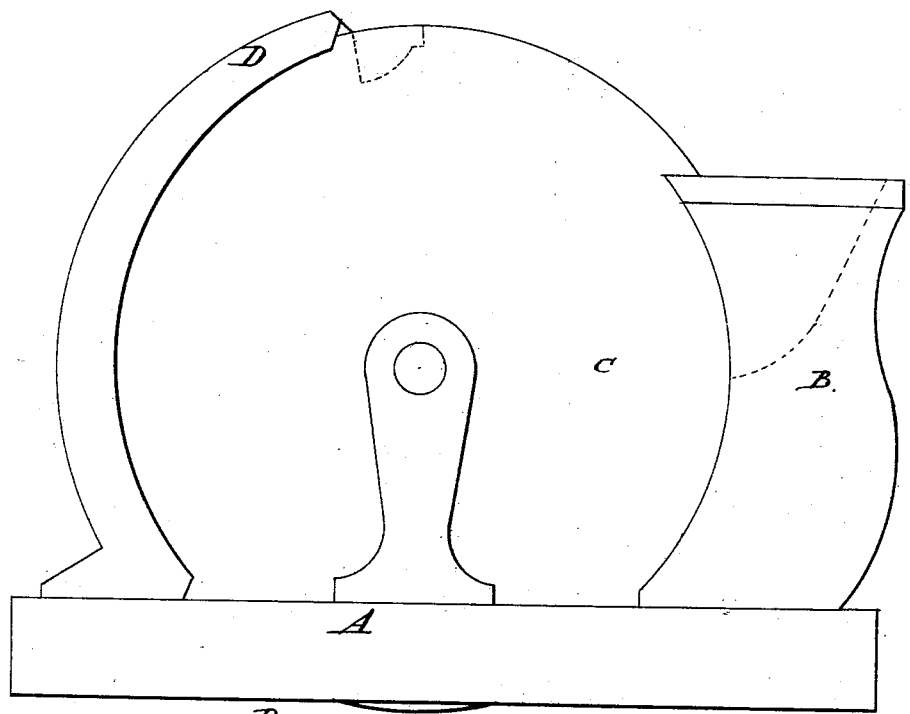
Figure 2:
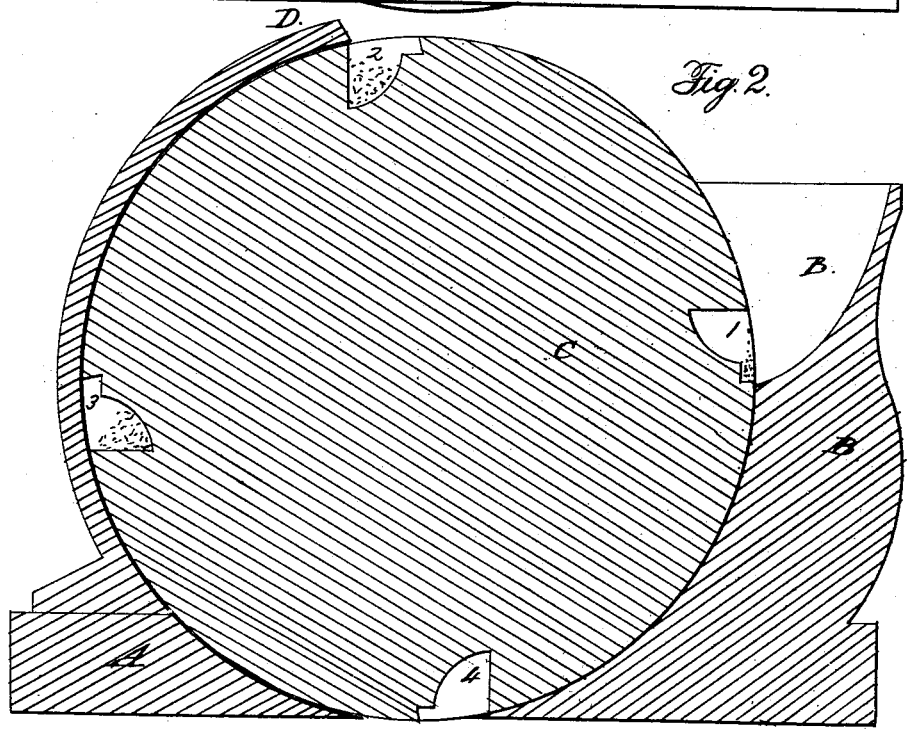

Figure 1 represents a side view, and Fig. 2, a vertical longitudinal section through the same.

Similar letters in both figures denote like parts.

The nature of my invention relates to the peculiar form of the cells in the seeding-wheel in combination with the cap or scroll, so that the grain shall shift from the smaller to the larger part of the cells as it rotates, and thus prevent the grain from packing or choking in the cells and insuring its delivery when the seeding-wheel comes opposite the openings whence the grain falls to the ground.

To enable others skilled in the art to make and use my invention, I will proceed to describe the same with reference to the drawings.

A represents the base or frame, on which the parts herein claimed as new are arranged, and this frame may be mounted on wheels in any of the usual well-known ways.

B is the hopper or seed-box, which has its end next the seeding-wheel formed in the arc of a circle corresponding, or nearly so, with the circumference of the seeding-wheel, so that the periphery of said seeding-wheel shall become the side or end of the hopper to prevent the grain from falling out.

C is the seeding-wheel, which may have any suitable number of cells, 1, 2, 3, &c., in its periphery, and which may be arranged so as to drop at intervals, as in planting corn, or in furrows, as in drilling in wheat or other grain, it being obvious that the hopper may be extended and divided by partitions, and a series of these seeding-wheels be so arranged therein as to drill in a number of furrows at the same time.

The periphery of the seeding-wheel, as before stated, forms one of the ends of the hopper and moves against, instead of "wading through," the column of grain. By this arrangement the cells never become packed or choked, and the grain is free to leave the cells when they come opposite the proper openings—a feature not to be attained where the wheel passes through instead of against the grain; but to further insure the cells against choking they are made of a peculiar form or shape, which constitutes one of the leading elements in the success of this machine. As the wheel passes up through the end of the hopper that part of the cell (dotted in red to denote the grain) receives as much grain as will lie in the smaller portion thereof. The continuous rotation of the wheel brings the larger or deeper part of the cell underneath, and the grain drops from the shallow to the deeper portion thereof, and not being sufficient to fill the cell lies perfectly loose and ready to drop out whenever said cell comes opposite the proper openings for allowing it to pass to the furrow. The red dots represent the positions of the grain in the cells as they rotate. They are constantly changing, while there is nothing to press or pack them in the cells, and there are consequently no irregularities or failures in the certain dropping of the grain.

The cap or scroll D is concentric with the seeding-wheel, and is designed for holding the grain to the cells until it comes to the delivery-openings. This cap may be a plain curved piece of wood or metal, or may have flanges overhanging the sides of the wheels. Its object being to retain the seeds in the cells, any other well-known device may be substituted therefor without changing the character of the invention.

Having thus fully described the nature of my invention, what I claim therein as new, and desire to secure by Letters Patent, is—

In combination with the cap or scroll D, the peculiar form of the cells—that is to say, the receiving of the grain into the shallow part of the cell, from whence it gradually shifts into the deeper part thereof, and kept from falling out of the cells by the cap or scroll, by which means the packing or choking of the grain in the cells is entirely avoided, substantially as described.

MILAN WATERBURY.

Witnesses:
DAVID A. BROWN,
E. MELVIN POOR.